US011909628B1

(12) United States Patent
Friedman et al.

(10) Patent No.: US 11,909,628 B1
(45) Date of Patent: Feb. 20, 2024

(54) REMOTE DIRECT MEMORY ACCESS (RDMA) MULTIPATH

(71) Applicant: Mellanox Technologies, Ltd., Yokneam (IL)

(72) Inventors: Yamin Friedman, Jerusalem (IL); Idan Borshteen, Karmiel (IL); Roee Moyal, Yokne'am Illit (IL); Yuval Shpigelman, Netanya (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/901,671

(22) Filed: Sep. 1, 2022

(51) Int. Cl.
| *H04L 43/0864* | (2022.01) |
| *H04L 45/24*   | (2022.01) |
| *H04L 45/12*   | (2022.01) |
| *H04L 47/52*   | (2022.01) |

(52) U.S. Cl.
CPC ........ *H04L 45/124* (2013.01); *H04L 43/0864* (2013.01); *H04L 45/24* (2013.01); *H04L 47/52* (2013.01)

(58) Field of Classification Search
None
See application file for complete search history.

(56) References Cited

U.S. PATENT DOCUMENTS

| 10,785,163 | B2 * | 9/2020  | Nahum ............... H04L 45/24 |
| 11,765,237 | B1 * | 9/2023  | Liss ................. H04L 67/141 |
|            |      |         | 709/228 |
| 2005/0100035 | A1 * | 5/2005 | Chiou ............... H04L 45/24 |
|              |      |        | 370/389 |
| 2010/0172243 | A1 * | 7/2010 | Nakata .............. H04L 47/10 |
|              |      |        | 370/237 |
| 2019/0158429 | A1 * | 5/2019 | Friedman ........... H04L 41/06 |
| 2019/0288948 | A1 * | 9/2019 | Hira ................. H04L 45/125 |
| 2022/0309025 | A1 * | 9/2022 | Chen ................. H04L 69/14 |
| 2022/0400074 | A1 * | 12/2022 | Srinivasan ......... H04L 69/14 |

* cited by examiner

*Primary Examiner* — Joshua Joo
(74) *Attorney, Agent, or Firm* — Lowenstein Sandler LLP

(57) ABSTRACT

Technologies for spreading a single transport flow across multiple network paths in remote direct memory access (RDMA) over converged Ethernet (RoCE) and InfiniBand are described. A network interface controller receives a first packet and a second packet of a transport flow directed to a second node. The network interface controller assigns a first network routing identifier to the first packet and a second network routing identifier to the second packet, the first network routing identifier corresponding to a first network path between the first and second nodes, the second network routing identifier corresponding to a second network path between the first node and the second node. The network interface controller schedules a first packet of the transport flow to be sent via the first network path and a second packet of the transport flow to be sent via the second network path.

18 Claims, 7 Drawing Sheets

REMOTE DIRECT MEMORY ACCESS (RDMA) MULTIPATH

TECHNICAL FIELD

At least one embodiment pertains to processing resources used to perform and facilitate network communications. For example, at least one embodiment pertains to remote direct memory access technology, and more specifically, to spreading packets of a single transport flow across multiple network paths to a same destination.

BACKGROUND

Remote direct memory access (RDMA) technology enables network adapters to transfer data over a network directly to (or from) memory of a remote device without storing data in data buffers of the operating system of the remote device. Advantages of RDMA include reduced computations and caching by processing devices, e.g., central processing units (CPUs), elimination of the need to copy the data between various network layers, convenient discretization of transmitted data, and so on. RDMA transactions are supported by a number of communication protocols, including RDMA over Converged Ethernet (RoCE), which facilitates RDMA operations using conventional standard Ethernet infrastructure, Internet Wide Area RDMA Protocol (iWARP), which facilitates RDMA operations using Transmission Control Protocol (TCP), and InfiniBand™, which provides native support for RDMA operations. RDMA transactions are especially useful in cloud computing applications and numerous applications that require high data transmission rates and low latency.

Currently, in RoCE, there is an assumption that all packets for a specific transport flow will travel across the same network path. There is a mechanism used in Ethernet networks, called Equal-Cost multipath (ECMP), which is meant to spread different transport flows evenly across multiple network paths, but this mechanism does not work well in many cases. There is no mechanism in RoCE to spread a specific transport flow evenly across multiple network paths.

BRIEF SUMMARY

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
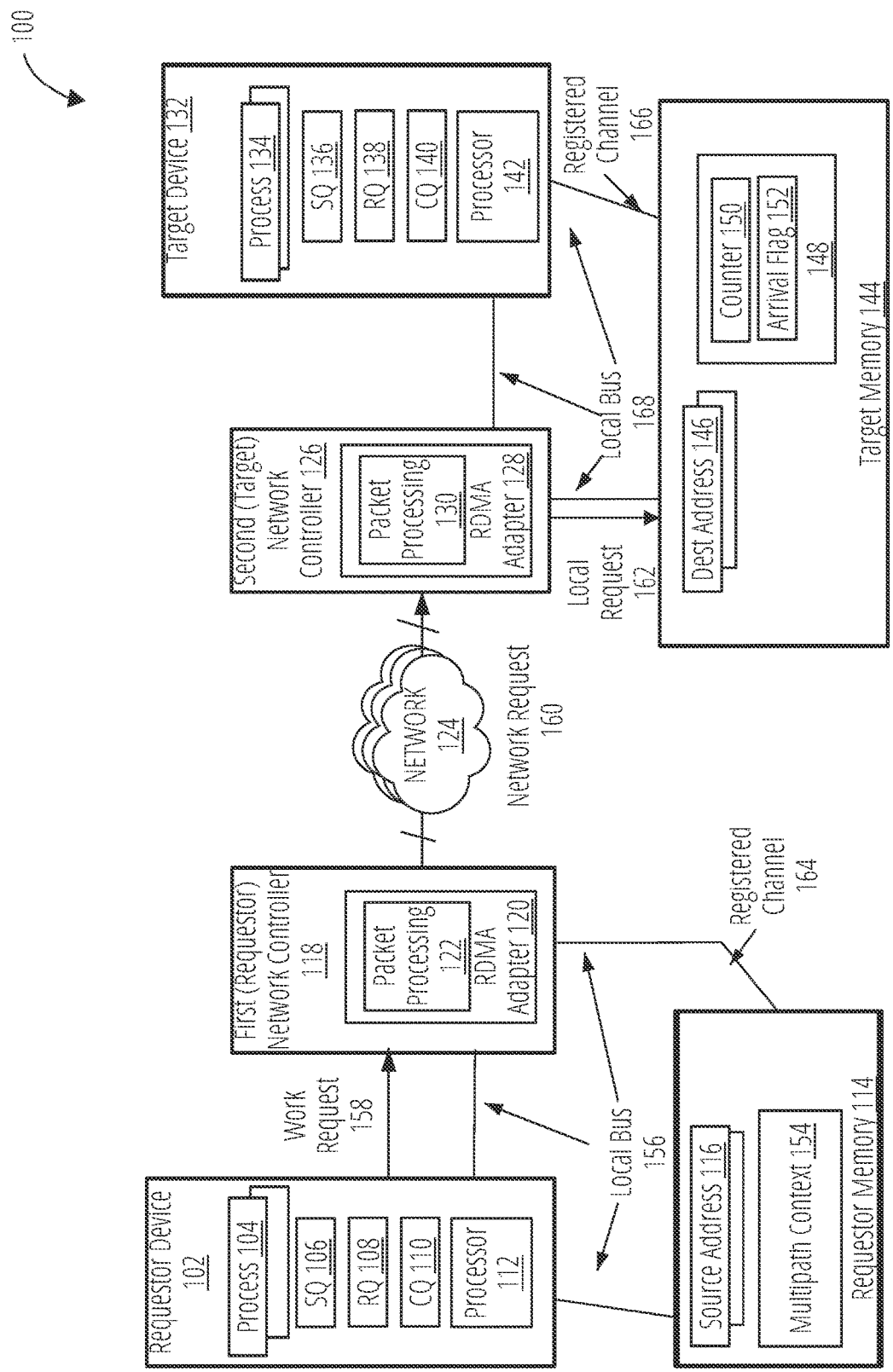
FIG. 1 is a block diagram of an example network architecture capable of spreading a single transport flow across multiple network paths, according to at least one embodiment.

Technologies for spreading a single transport flow across multiple network paths in RoCE and InfiniBand are described. As described above, there is no mechanism in RoCE to spread a transport flow across multiple network paths because there is an assumption that all packets for a specific transport flow will travel across the same network path. Today with static routing, there are cases where multiple flows can be set to the same link in the network, causing congestion even when there are other routes that are not being utilized. In certain cases, it is possible to solve this problem with an additional software layer. An additional software layer requires changes to the software application programming interface (API), and it can add significant overhead in resources and computations. Without hardware support for every queue pair (QP) that the software opens, the software would have to open as many QPs as the desired paths in the network.

Aspects and embodiments of the present disclosure address these and other challenges by providing mechanisms and methods for spreading a transport flow across multiple paths in the network while maintaining control at an end point. Aspects and embodiments of the present disclosure can improve network utilization by spreading the transport flow across multiple network paths. Aspects and embodiments of the present disclosure can enable software to load different network routing identifiers for a specific transport flow, and the hardware can use these network routing identifiers while sending traffic to send packets across all of the given network paths at a finer granularity. Aspects and embodiments of the present disclosure can enable hardware to send packets with multiple different routing parameters without software intervention in the data path. Aspects and embodiments of the present disclosure can enable spreading traffic for a single transport flow on multiple routes transparently to an application. Aspects and embodiments of the present disclosure can monitor individual routes and identify which routers are more or less congested. Aspects and embodiments of the present disclosure can provide a fast recovery mechanism in the case of a transport error.

Aspects and embodiments of the present disclosure are relevant for any networks that provide multiple routes between any two end node devices. One example use case includes a network where the end node devices have a higher aggregate bandwidth than individual links in the network. Another use case example includes a network with static routing may have cases of congestion caused by unlucky application interaction. Another use case is where applications are very sensitive to tail latencies caused during an error event.

Aspects and embodiments of the present disclosure can be used in channel adapters, network adapters, network interface cards (NICs), or the like. A channel adapter (CA), whether a network channel adapter or a host channel adapter, refers to an end node in an InfiniBand Network with features for InfiniBand and RDMA, whereas NIC is similar but for an Ethernet network. Network interface controller, also known as a NIC, network adapter, local area network (LAN) adapter, or physical network interface, refers to a computer hardware component that connects a computer to a computer network. The network interface controller can provide interfaces to a host processor, multiple receive and transmit queues for multiple logical interfaces, and traffic processing. The network interface controller can be both a physical layer and data link layer device, as it provides physical access to a networking medium and a low-level addressing system through the use of media access control (MAC) addresses that are uniquely assigned to network interfaces. The technologies described herein can be implemented in these various types of devices and are referred to herein as "network interface controller" or "network controller." That is, the network interface controller can be a channel adapter, a NIC, a network adapter, or the like. The network interface controller can be implemented in a personal computer (PC), a set-top box (STB), a server, a network router, a switch, a bridge, a data processing unit (DPU), a network card, or any device capable of sending packets over multiple network paths to another device.

FIG. 1 is a block diagram of an example network architecture 100 capable of spreading a single transport flow across multiple network paths, according to at least one embodiment. As depicted in FIG. 1, network architecture 100 can support operations of a requestor device 102 connected over local bus 156 to a first network controller 118 (a requestor network controller). The first network controller 118 can be connected, via a network 124, to a second network controller 126 (a target network controller) that supports operations of a target device 132. Network 124 can be a public network (e.g., the Internet), a private network (e.g., a local area network (LAN), or wide area network (WAN)), a wireless network, a personal area network (PAN), or a combination thereof. RDMA operations can support the transfer of data from a requestor memory 114 directly to (or from) a target memory 144 without software mediation by the target device 132.

Requestor device 102 can support one or more applications (not explicitly shown in FIG. 1) that can manage various processes 104 that control communication of data with various targets, including target memory 144. To facilitate memory transfers, processes 104 can post work requests (WRs) to a send queue (SQ) 106 and to a receive queue (RQ) 108. SQ 106 can be used to request one-sided READ, WRITE, and ATOMIC operations as well as two-sided SEND operations, while RQ 108 can be used to facilitate two-sided RECEIVE requests. Similar processes 134 can operate on target device 132 that supports its own SQ 136 and RQ 138. A connection between requestor device 102 and target device 132 bundles SQs and RQs into queue pairs (QPs), e.g., SQ 106 (or RQ 108) on requestor device 102 is paired with RQ 138 (or SQ 136) on the target device 132. More specifically, to initiate a connection between requestor device 101 and target device 132, the processes 104 and 134 can create and link one or more queue pairs.

To perform a data transfer, process 104 creates a work queue element (WQE) that specifies parameters such as the RDMA verb (operation) to be used for data communication and also can define various operation parameters, such as a source address 116 in a requestor memory 114 (where the data is currently stored), a destination address 146 in a target memory 144, and other parameters, as discussed in more detail below. Requestor device 102 can then put the WQE into SQ 106 and send a WR 158 to the first network controller 118, which can use an RDMA adapter 120 to perform packet processing 122 of the WQE and transmit the data indicated in source address 116 to the second network controller 126 via network 124 using a network request 160.

An RDMA adapter 128 can perform packet processing 130 of the received network request 160 (e.g., by generating a local request 162) and store the data at a destination address 146 of target memory 144. Subsequently, target device 132 can signal a completion of the data transfer by placing a completion event into a completion queue (CQ) 110 of requestor device 102, indicating that the WQE has been processed by the receiving side. Target device 132 can also maintain CQ 140 to receive completion messages from requestor device 102 when data transfers happen in the opposite direction, from the target device 132 to requestor device 102.

Operation of requestor device 102 and target device 132 can be supported by respective processors 112 and 142, which can include one or more processing devices, such as CPUs, graphics processing units (GPUs), application-specific integrated circuits (ASICs), field-programmable gate arrays (FPGAs), or any combination thereof. In some embodiments, any of requestor device 102, the first network controller 118, and/or requestor memory 114 can be implemented using an integrated circuit, e.g., a system-on-chip. Similarly, any of target device 132, the second network controller 126, and/or target memory 144 can be implemented on a single chip. The requestor device 102 and first network controller 118 can be implemented in a personal computer (PC), a set-top box (STB), a server, a network router, a switch, a bridge, a data processing unit (DPU), a network card, or any device capable of sending packets over multiple network paths to another device.

Processors 112 and 142 can execute instructions from one or more software programs that manage multiple processes 104 and 134, SQs 106 and 136, RQs 108 and 138, CQs 110 and 140, and the like. For example, software program(s) running on requestor device 102 can include host or client processes, a communication stack, and a driver that mediates between requestor device 102 and first network controller 118. The software program(s) can register direct channels of communication with respective memory devices, e.g., RDMA software programs running on requestor device 102 can register a direct channel 164 of communication between the first network controller 118 and requestor memory 114 (and, similarly, a direct channel 166 of communication between the second network controller 126 and target memory 144). Registered channels 164 and 166 can then be used to support direct memory accesses to the respective memory devices. In the course of RDMA operations, the software program(s) can post WRs, repeatedly check for completed WRs, balance workloads among the multiple RDMA operations, balance workload between RDMA operations and non-RDMA operations (e.g., computations and memory accesses), and so on. The requestor device 102 and first network controller 118 can be used implemented in a personal computer (PC), a set-top box (STB), a server, a network router, a switch, a bridge, a data processing unit (DPU), a network card, or any device capable of sending packets over multiple network paths to another device.

RDMA accesses to requestor memory 114 and/or target memory 144 can be performed via network 124, local bus 156 on the requestor side, and bus 168 on the target side and can be enabled by the Converged Ethernet (RoCE) protocol, iWARP protocol, and/or InfiniBand™, TCP, and the like.

As disclosed in more detail below, RDMA accesses can be facilitated using a multipath context 154 (also referred to as hardware multipath context or a session group context) for spreading a single transport flow over multiple network paths of the network 124. The multipath context 154 can be stored in requestor memory 114 or in memory, cache, or storage in the first network controller 118. The multipath context 154 can be a hardware context per session group that would maintain a state per configured route to the destination. Different routes/network paths to the same destination end point are defined as sessions in a session group. For example, three network paths to a destination end point would have three sessions in a session group. There can be some translation between sessions to a certain destination and the parameters that will be set in the wire protocol headers. After a QP sends a burst of data, it may decide, based on certain parameters, that the next burst will be sent in a different route. When the QP is scheduled again to send a burst, the QP can select one of the routes provided in the multipath context 154 (e.g., hardware multipath context) based on their relative weights as described in more detail below. While sending traffic on each route, Round-Trip Time (RTT) can be measured by a congestion control (CC) algorithm, and those measurements can be used to adjust the weights for the different routes to identify which are more or less congested. RTT is the amount of time it takes for a data packet to be sent to a destination plus the time it takes for an acknowledgment of that packet to be received back at the origin. The multipath context 154 can be used to optimally utilize multiple routes to the same destination. In cases where there is limited out-of-order support in the hardware, a fence can be used when changing routers, which adds an overhead that needs to be taken into account. If full packet reordering is available at the end node, then no additional changes are needed. The multipath feature described herein can be set up during session negotiation by a session negotiation mechanism. The multipath feature can be based on RoCE, InfiniBand, or other similar transport technologies.

The first network controller 118 can spread a transport flow across multiple paths in the network 124 while maintaining control at an end point using the multipath context 154. The RDMA adapter 120 can improve network utilization by spreading the transport flow across multiple network paths. The first network controller 118 can enable software to load different network routing identifiers for a specific transport flow, and the hardware can use these network routing identifiers while sending traffic to send packets across all of the given network paths at a finer granularity. Network routing identifiers refers to a value that is part of a packet header field (also referred to as a header field in wire protocol headers). The first network controller 118 can enable hardware to send packets with multiple different routing parameters without software intervention in the data path. The first network controller 118 can enable spreading traffic for a single transport flow on multiple routes transparently to the process 104 (e.g., an application). The first network controller 118 can monitor individual routes and identify which routers are more or less congested. The first network controller 118 can provide a fast recovery mechanism in the case of a transport error. The second network controller 126 can similarly perform similar functions.

In at least one embodiment, the requestor device 102 and the first network controller 118 are part of a first node device, and the target device 132 and the second network controller 126 are part of a second node device. There can be multiple intervening nodes between the first node device and the second node device. At a minimum, there should be at least two paths between the first node device and the second node device.

Figure 2:
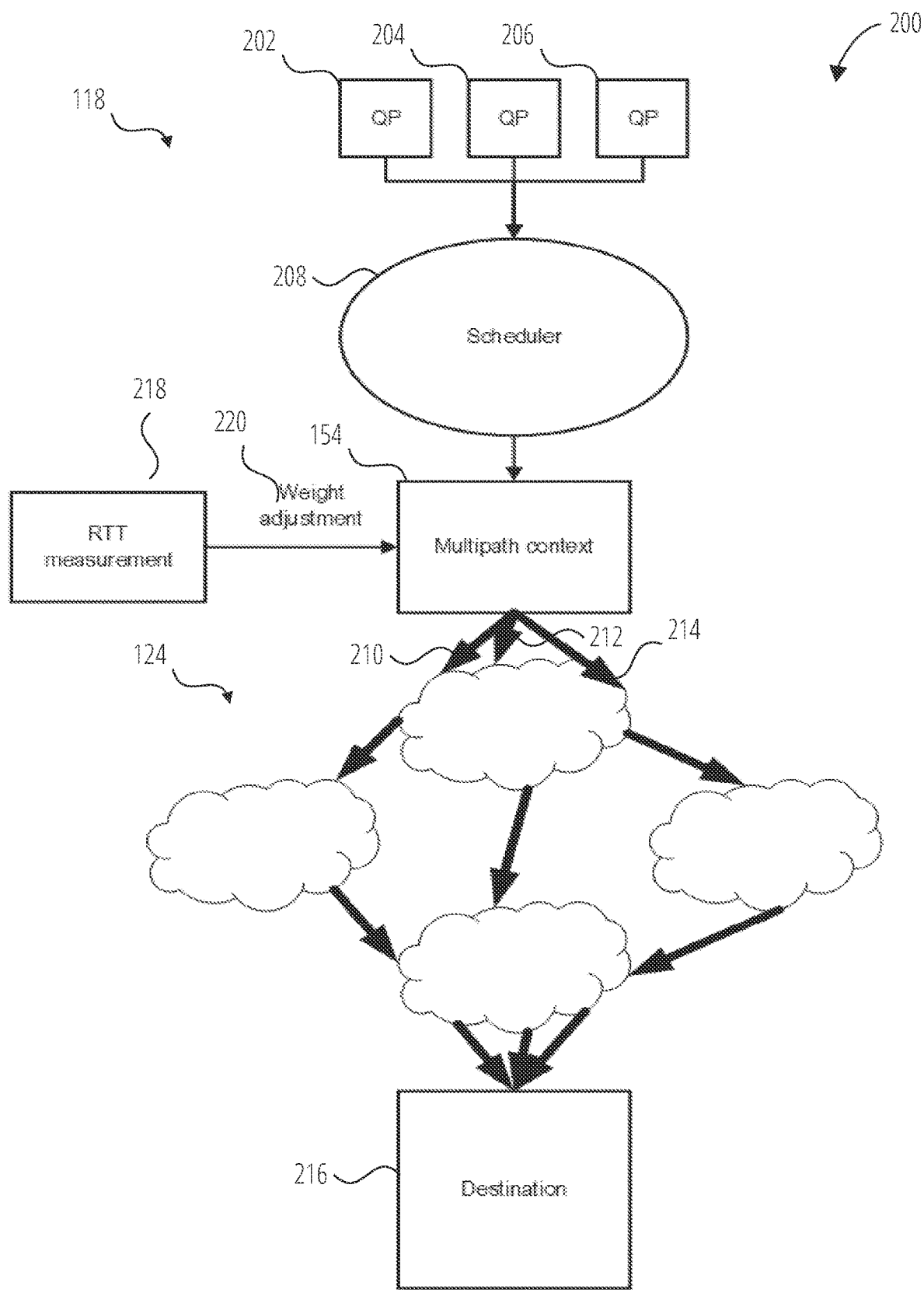
FIG. 2 is a diagram illustrating a scheduling flow that can send bursts on any of the routes through a network to a given destination, according to at least one embodiment.

FIG. 2 is a diagram illustrating a scheduling flow 200 that can send bursts on any of the routes through a network to a given destination, according to at least one embodiment. In the scheduling flow 200, a scheduler 208 can schedule transfers for multiple QPs 202, 204, 206. The scheduler 208 can use the multipath context 154 to spread packets of a single transport flow over multiple network paths 210, 212, 214, of the network 124 to a destination end point 216. The network paths 210, 212, 214 are different paths to the same destination end point 216. The multipath context 154 can store a state of each network paths 210, 212, 214. The multipath context 154 can store a hardware context for each session group. As illustrated in FIG. 2, there are three network paths 210, 212, 214. Network paths to the same destination end point 216 are three sessions in a single session group. The QPs 202, 204, 206 can be multipath QPs that can be assigned to a session group. There will be a hardware multipath context 154 assigned per session group. The multipath context 154 can maintain a weight per session in the session group. The number of sessions per session group is configurable (e.g., 8 sessions per session group would result in at least three bits in the wire protocol headers to identify the respective sessions). For example, the QPs 202, 204, 206, can be part of one session group or separate session groups. In at least one embodiment, the QPs 202, 204, 206 can be part of the same session group associated with the multipath context 154. Other multipath contexts (not illustrated in FIG. 2) can be used for other session groups.

As described above, the multipath context 154 can be a hardware context per session group that would maintain a state per configured route to the destination end point 216. For example, during operation, after QP 202 sends a burst of data, the scheduler 208 can decide based on certain parameters that the next burst sent from the QP 202 will be sent in a different route. When QP 202 is scheduled to send its next burst, the scheduler 208 can select one of the routes provided in the multipath context 154 (e.g., hardware multipath context) based on their relative weights. In at least one embodiment, one or more RTT measurements 218 can be fed into the multipath context 154 as weight adjustments 220. In at least one embodiment, the QP 202 includes a congestion control (CC) algorithm that uses the weight adjustment(s) 220 in the multipath context 154 to select one of the network paths 210, 212, 214 that is less congested. The multipath context 154 can be used to optimally utilize the different network paths 210, 212, 214 for sending packets of a transport flow to the same destination end point 216.

As described above, different routes to the same destination are defined as sessions in a session group. The multipath QPs 202, 204, 206 can be assigned to a session group. There will be some translation between sessions to a certain destination and the parameters that will be set in the wire protocol headers. In at least one embodiment, a software process is used to ensure that the multipath context 154 holds the correct sessions that cause switches in the network 124 to route the packets across the different network paths 210, 212, 214. If there are any changes in switch configurations, the software process can update the multipath context 154, and the weight adjustments can be reset.

In at least one embodiment, the first network controller 118 of requestor device 102 assigns a first network routing identifier to one or more packets in a first session of a session group associated with a transport flow directed to the destination end point 216. The transport flow uses a network protocol that allows RDMA, such as RoCE or Infiniband. The first network routing identifier corresponds to the first network path 210. The first network routing identifier in the one or more packets causes these packets to be routed to the destination end point 216 via the first network path 210. The first network controller 118 assigns a second network routing identifier to one or more packets in a second session of the session group associated with the transport flow directed to the destination end point 216. The second network routing identifier corresponds to network path 212. The second network routing identifier in the one or more packets causes these packets to be routed to the destination end point 216 via the second network path 212. The first network controller 118 assigns a third network routing identifier to one or more packets in a third session of the session group associated with the transport flow directed to the destination end point 216. The third network routing identifier corresponds to network path 214. The third network routing identifier in the one or more packets causes these packets to be routed to the destination end point 216 via the third network path 214. If there are additional network paths between the requestor device 102 and the destination end point 216, additional network routing identifiers can be used. In at least one embodiment, software or firmware can handle defining the network routing identifiers to the different network paths and the network switch configuration. The network routing identifiers can also be referred to as router identifiers or path identifiers.

During operation, processing logic associated with the QP 202 can select the first network path 210 to send a first burst of packets, such as one or more packets in the first session, to the destination end point 216. When the scheduler 208 schedules QP 202 for sending traffic, the first session of one or more packets is sent to the destination end point 216. As described above, when the one or more packets of the first session are sent across the network 124, the first network routing identifier causes the one or more packets to be routed to the destination end point 216 via the first network path 210.

After scheduling and sending the first session (i.e., a specific network path over which the first burst is sent), the processing logic associated with QP 202 can determine whether to change routes (i.e., a different network path) or not based on one or more parameters. The one or more parameters can include bursts since the last route change, the weight of a current route compared to weights of other routes, a requirement of an input fence, random entropy, or the like. In at least one embodiment, the decision is made at the end of the first burst so that a fence can be added if needed. In some cases, there may be a requirement that does not allow a change in the middle of a message. The processing logic can implement an algorithm to determine when to switch routes. This algorithm may require some flexibility to be used for different use cases. The choice of when to make a route change can be programmable by a management application.

Assuming the processing logic decides to change routes from the first network path 210, when the scheduler 208 schedules the QP 202 for sending traffic again, the second session of one or more packets is sent to the destination end point 216. As described above, when the one or more packets of the second session are sent across the network 124, the second network routing identifier causes the one or more packets to be routed to the destination end point 216 via the second network path 212.

After scheduling and sending the second session (i.e., a different network path over which the next burst is sent), the processing logic associated with QP 202 can determine whether to change routes (i.e., a different network path) or not based on one or more parameters as described above. Assuming the processing logic decides to change routes from the second network path 212, when the scheduler 208 schedules the QP 202 for sending traffic again, the third session of one or more packets is sent to the destination end point 216. As described above, when the one or more packets of the third session are sent across the network 124, the third network routing identifier causes the one or more packets to be routed to the destination end point 216 via the third network path 214.

Using the scheduler 208, the requestor device 102 sends the one or more packets of the first session to the destination end point 216 via the first network path 210, the one or more packets of the second session to the destination end point 216 via the second network path 212, and the one or more packets of the third session to the destination end point 216 via the third network path 214.

In at least one embodiment, the scheduler 208 can schedule similar sessions of QP 204 and QP 206 to be sent. The scheduler 208 can alternate between QPs 202, 204, and 206 according to a scheduling scheme.

For new route selection, once the processing logic associated with a QP has decided to change routes upon the next scheduling, a route needs to be chosen. The selection of the new route is made at this later time as the relative weights of the different routes may change in the time it takes for the next scheduling of the QP, allowing the most updated values to be used for new route selection. In at least one embodiment, the new route can be selected by a probabilistic function of the weights of the different routes. This method can avoid the case where all the QPs move to the highest-ranked route, which will then be over-congested until the QPs can move to a new route.

In at least one embodiment, a packet header field can be used to identify the route. That is, the packet header field can contain the network routing identifier corresponding to the selected network path. In at least one embodiment, the packet header field can identify a session port. Switches need to be compatible in that they can route based on the network routing identifier in the packet header field. In at least one embodiment, the compatibility at the end node is negotiated to ensure there is support for packet reordering of the packets arriving from different network paths. The main assumption for multipath transport is that by changing the session, the requestor device can select different routes through the network to the same destination. When interoperating with an end node device that does not support packet reordering, the requestor device can ensure that the operations are fenced before a route change. In cases where there is limited out-of-order support in the hardware, a fence can be used when changing routers, which adds an overhead that needs to be taken into account. If full packet reordering is available at the end node, then no additional changes are needed. The multipath feature described herein can be set up during session negotiation by a session negotiation mechanism. The multipath feature can be based on RoCE, or other similar transport technologies.

As described above, the route weights can be updated to ensure the spreading of packets over multiple routes to the same destination, such as described in more detail below with respect to FIG. 3.

Figure 3:
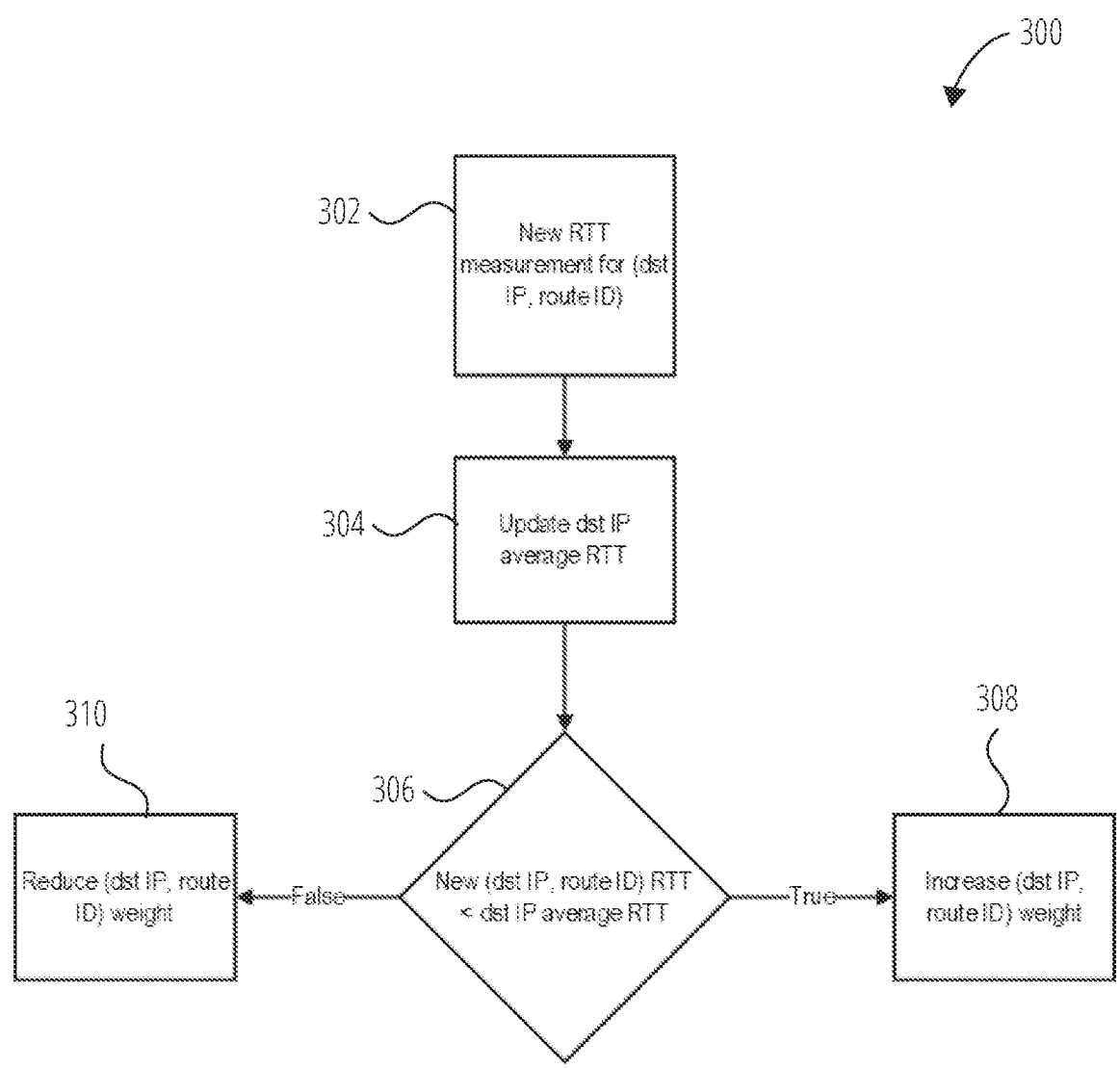
FIG. 3 is a flow diagram of a method for updating route weights according to at least one embodiment.

FIG. 3 is a flow diagram of a method 300 for updating route weights according to at least one embodiment. The method 300 can be performed by processing logic comprising hardware, software, firmware, or any combination thereof. In at least one embodiment, the method 300 is performed by the requestor device 102 of FIG. 1. In at least one embodiment, the method 300 is performed by the target device 132 of FIG. 1. In at least one embodiment, the first network controller 118 of FIG. 1 and FIG. 2 performs the method 300. In another embodiment, the method 300 is performed by the second network controller 126 of FIG. 1. In one embodiment, the method 300 can be programmable by users.

Referring to FIG. 3, the method 300 begins with the processing logic determining a new RTT measurement for a network routing identifier (routeID) and destination address (e.g., destination Internet Protocol (IP) address) (block 302). For route weight updating, when a burst is sent on a specific route, an RTT measurement packet can be added to constantly check the RTT for each route. To take into account the possibility of last hop congestion, which will affect all the routes equally, the weights can be based on the difference from the average RTT for the destination. The processing logic updates an average RTT for the destination address (block 304). The processing logic determines whether the new RTT measurement is less than the average RTT (block 306). If the new RTT measurement is less than the average RTT for the destination, the processing logic increases a weight value for the network routing identifier (destination address, routeID) (block 308). If the new RTT measurement is not less than the average RTT for the destination, the processing logic reduces the weight value for the network routing identifier (destination address, routeID) (block 310).

In another embodiment, during QP connection, the multipath context can be initiated, and the switches can be properly configured to multipath. The multipath can be configurable on a per QP basis. The multipath context allows limited software intervention in the use of multipath, so on the data path itself, there should be no changes.

In at least one embodiment, the hardware multipath context can be controlled by a management process that has control over switch routing. The hardware multipath context can be unavailable to untrusted users. In another embodiment, the changing of the multipath parameters should be determined by a management interface per network. In some cases, there can be hardware handling, firmware handling, software handling, or any combination thereof. For example, if a route becomes unusable, this case will be identified by path measurements, which will inform the firmware handling to remove the entry from the multipath context.

Figure 4:
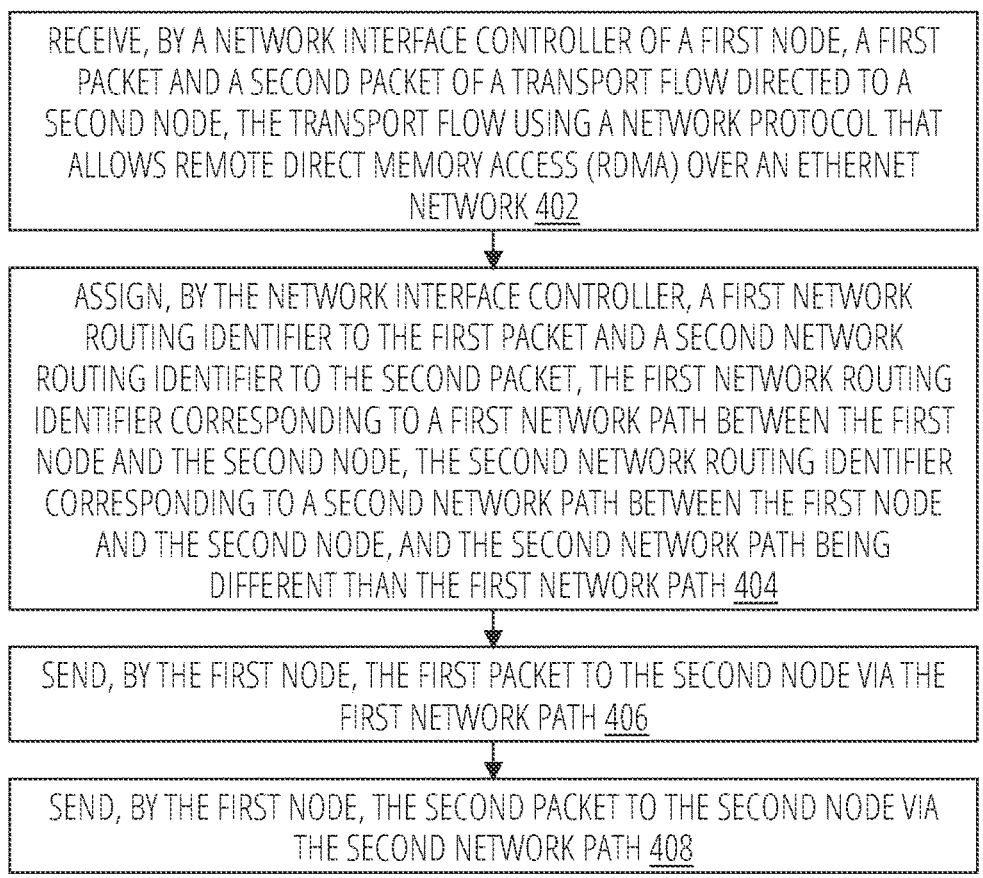
FIG. 4 is a flow diagram of a method for updating route weights according to at least one embodiment.

FIG. 4 is a flow diagram of a method 400 for updating route weights according to at least one embodiment. The method 400 can be performed by processing logic comprising hardware, software, firmware, or any combination thereof. In at least one embodiment, the method 400 is performed by the requestor device 102 of FIG. 1. In at least one embodiment, the method 400 is performed by the target device 132 of FIG. 1. In at least one embodiment, the first network controller 118 of FIG. 1 and FIG. 2 performs the method 400. In another embodiment, the method 400 is performed by the second network controller 126 of FIG. 1. In another embodiment, the method 400 is performed by a network interface controller of a first node.

Referring to FIG. 4, the method 400 begins with the processing logic receiving a first packet and a second packet of a transport flow directed to a second node, the transport flow using a network protocol that allows RDMA (block 402). At block 404, the processing logic assigns a first network routing identifier to the first packet and a second network routing identifier to the second packet. The first network routing identifier corresponds to a first network path between the first node and the second node. The second network routing identifier corresponds to a second network path between the first node and the second node. The second network path is different than the first network path. At block 406, the processing logic sends the first packet to the second node via the first network path. At block 408, the processing logic sends the second packet to the second node via the second network path.

In one embodiment, the first packet is part of a first burst of packets assigned to the first network routing identifier, and the second packet is part of a second burst of packets assigned to the second network routing identifier.

In at least one embodiment, the processing logic determines a congestion metric for each of the multiple network paths between the first node and the second node. The processing logic identifies the first network path for the first packet and the second network path for the second packet using the congestion metrics. An aggregate bandwidth of the first network path and the second network path collectively is greater than an individual bandwidth of the first network path.

In at least one embodiment, the processing logic assigns a first QP and a second QP to a hardware multipath context. The hardware multipath context stores a first state associated with the first network routing identifier and a second state associated with the second network routing identifier. The hardware multipath context is associated with a session group. The first network routing identifier can be used for a first session of the session group. The second network routing identifier can be used for a second session of the session group. In another embodiment, the processing logic assigns a first QP to a hardware multipath context, and the first session and the second session both use the same QP.

In at least one embodiment, the processing logic receives, from the first QP, a first burst of data in a first session. The processing logic schedules, using the hardware multipath context, the first burst of data to be sent on the first network path. The processing logic receives, from the first QP or the second QP, a second burst of data in a second session. The processing logic schedules, using the hardware multipath context, the second burst of data to be sent on the second network path.

In at least one embodiment, the processing logic determines that a subsequent burst of data is to be sent on a different network path than the first network path based on one or more parameters. The hardware multipath context can store a first weight value associated with the first network routing identifier and a second weight value associated with the second network routing identifier. The processing logic selects, based on at least the second weight value, the second network routing identifier for the second burst of data, responsive to determining that the subsequent burst of data is to be sent on the different network paths.

In at least one embodiment, the processing logic measures an RTT of the first network path and updates the first weight value based on the RTT. The hardware multipath context is associated with a transport session group. The processing logic can assign a third QP and a fourth QP to a second hardware multipath context associated with a second session group. The processing logic receives, from the third QP, a third burst of data in a third session. The processing logic schedules, using the second hardware multipath context, the third burst of data to be sent on a third network path between the first node and a third node. The third network path is different than the first network path. The processing logic receives from the third QP or the fourth QP, a fourth burst of data in a fourth session. The processing logic schedules, using the second hardware multipath context, the fourth burst of data to be sent on a fourth network path between the first node and the third node. The fourth network path is different than the third network path.

Figure 5A:
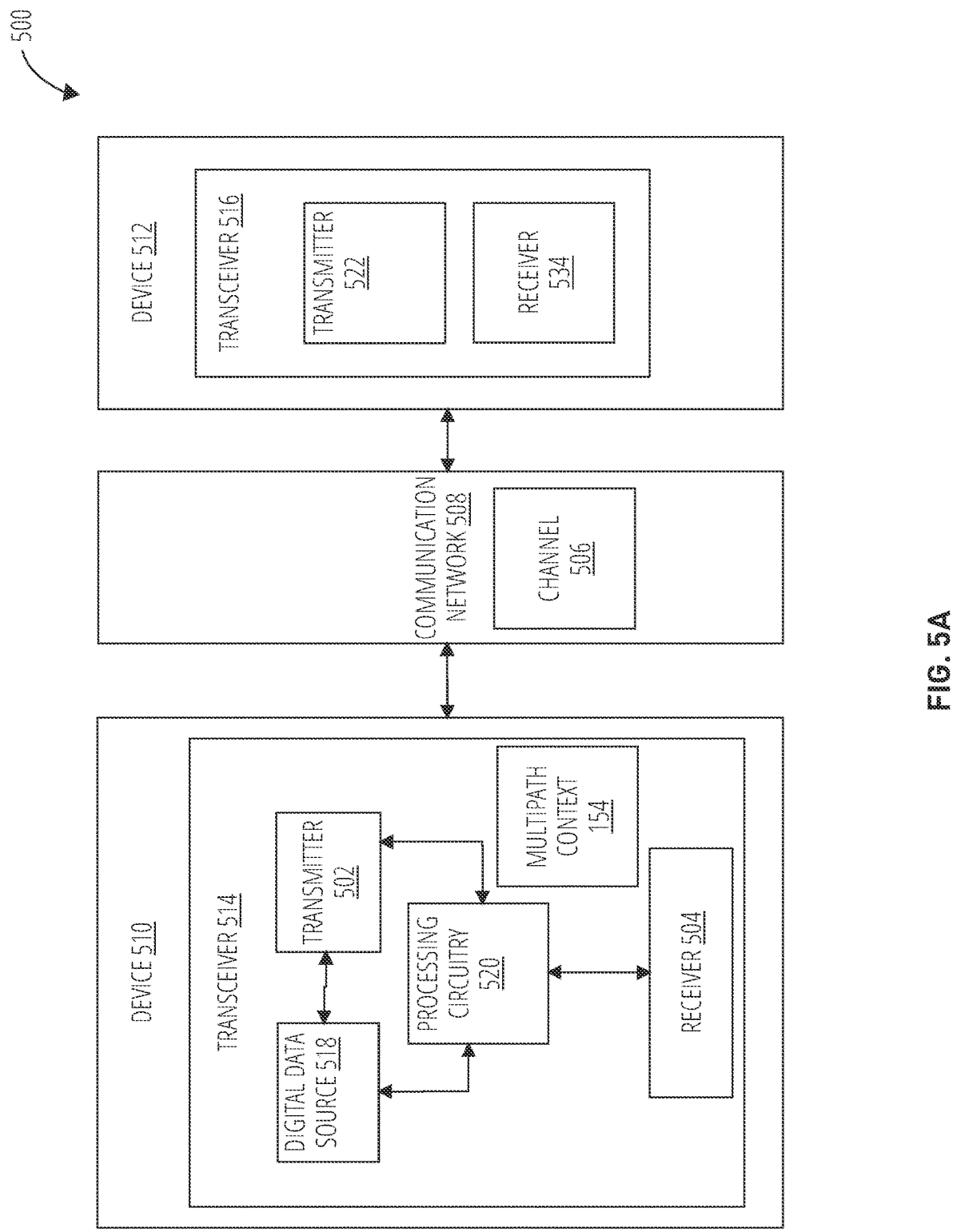
FIG. 5A illustrates an example communication system with multipath context, in accordance with at least some embodiments.

FIG. 5A illustrates an example communication system 500 with multipath context 154, in accordance with at least some embodiments. The communication system 500 includes a device 510, a communication network 508 including a communication channel 506, and a device 512. In at least one embodiment, the devices 510 and 512 are integrated circuits of a Personal Computer (PC), a laptop, a tablet, a smartphone, a server, a collection of servers, or the like. In some embodiments, the devices 510 and 512 may correspond to any appropriate type of device that communicates with other devices also connected to a common type of communication network 508. According to embodiments, the transmitters 502 and 522 of devices 510 or 512 may correspond to transmitters of a GPU, a switch (e.g., a high-speed network switch), a network adapter, a CPU, a data processing unit (DPU), etc.

Examples of the communication network 508 that may be used to connect the devices 510 and 512 include wires, conductive traces, bumps, terminals, or the like. In one example, the communication network 508 is a network that enables data transmission between the devices 510 and 512 using data signals (e.g., digital, optical, wireless signals), clock signals, or both.

The device 510 includes a transceiver 514 for sending and receiving signals, for example, data signals. The data signals may be digital or optical signals modulated with data or other suitable signals for carrying data.

The transceiver 514 may include a digital data source 518, a transmitter 502, a receiver 504, and processing circuitry 520 that controls the transceiver 514. The digital data source 518 may include suitable hardware and/or software for outputting data in a digital format (e.g., in binary code and/or thermometer code). The digital data output by the digital data source 518 may be retrieved from memory (not illustrated) or generated according to input (e.g., user input). The transceiver 514 can use the multipath context 154 as described above with respect to FIG. 1 to FIG. 4.

The transceiver 514 includes suitable software and/or hardware for receiving digital data from the digital data source 518 and outputting data signals according to the digital data for transmission over the communication network 508 to a transceiver 516 of device 512.

The receiver 504 of device 510 may include suitable hardware and/or software for receiving signals, for example, data signals from the communication network 508. For example, the receiver 504 may include components for receiving processing signals to extract the data for storing in a memory. In at least one embodiment, the transceiver 516 includes a transmitter 522 and receiver 534. The transceiver 516 receives an incoming signal and samples the incoming signal to generate samples, such as using an analog-to-digital converter (ADC). The ADC can be controlled by a clock-recovery circuit (or clock recovery block) in a closed-loop tracking scheme. The clock-recovery circuit can include a controlled oscillator, such as a voltage-controlled oscillator (VCO) or a digitally-controlled oscillator (DCO) that controls the sampling of the subsequent data by the ADC.

The processing circuitry 520 may comprise software, hardware, or a combination thereof. For example, the processing circuitry 520 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 520 may comprise hardware, such as an ASIC. Other non-limiting examples of the processing circuitry 520 include an Integrated Circuit (IC) chip, a CPU, A GPU, a DPU, a microprocessor, an FPGA, a collection of logic gates or transistors, resistors, capacitors, inductors, diodes, or the like. Some or all of the processing circuitry 520 may be provided on a Printed Circuit Board (PCB) or collection of PCBs. It should be appreciated that any appropriate type of electrical component or collection of electrical components may be suitable for inclusion in the processing circuitry 520. The processing circuitry 520 may send and/or receive signals to and/or from other elements of the transceiver 514 to control the overall operation of the transceiver 514.

The transceiver 514 or selected elements of the transceiver 514 may take the form of a pluggable card or controller for the device 510. For example, the transceiver 514 or selected elements of the transceiver 514 may be implemented on a network interface card (NIC).

The device 512 may include a transceiver 516 for sending and receiving signals, for example, data signals over a channel 506 of the communication network 508. The same or similar structure of the transceiver 514 may be applied to transceiver 516, and thus, the structure of transceiver 516 is not described separately.

Although not explicitly shown, it should be appreciated that devices 510 and 512 and the transceiver 514 and transceiver 516 may include other processing devices, storage devices, and/or communication interfaces generally associated with computing tasks, such as sending and receiving data.

Figure 5B:
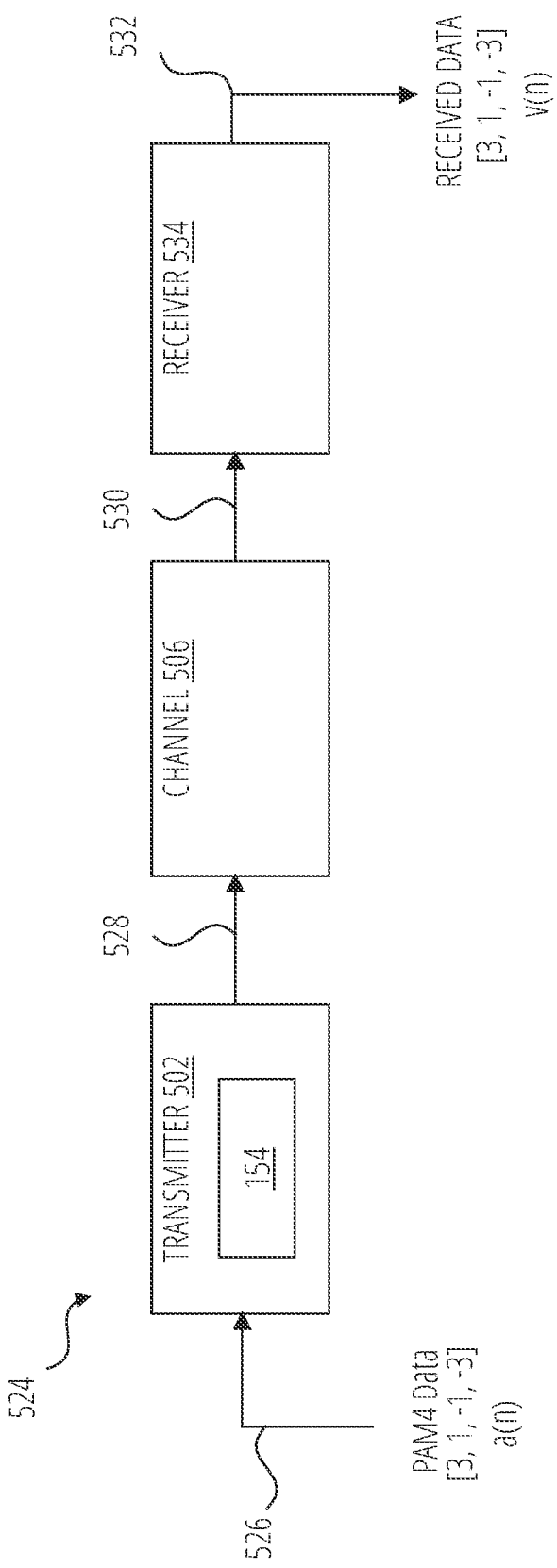
FIG. 5B illustrates a block diagram of an example communication system employing a transmitter with multipath context, according to at least one embodiment.

FIG. 5B illustrates a block diagram of an example communication system 524 employing a transmitter 502 with multipath context 154, according to at least one embodiment. In the example shown in FIG. 5B, a Pulse Amplitude Modulation level-4 (PAM4) modulation scheme is employed with respect to the transmission of a signal (e.g., digitally encoded data) from a transmitter (TX) 502 to a receiver (RX) 534 via a communication channel 506 (e.g., a transmission medium). In this example, the transmitter 502 receives an input data 526 (i.e., the input data at time n is represented as "a(n)"), which is modulated in accordance with a modulation scheme (e.g., PAM4) and sends the signal 528 a(n) including a set of data symbols (e.g., symbols −3, −1, 1, 3, where the symbols represent coded binary data). It is noted that while the use of the PAM4 modulation scheme is described herein by way of example, other data modulation schemes can be used in accordance with embodiments of the present disclosure, including for example, a non-return-to-zero (NRZ) modulation scheme, PAM7, PAM8, PAM16, etc. For example, for an NRZ-based system, the transmitted data symbols consist of symbols −1 and 1, with each symbol value representing a binary bit. This is also known as a PAM level-2 or PAM2 system as there are 2 unique values of transmitted symbols. Typically, a binary bit 0 is encoded as −1, and a bit 1 is encoded as 1 as the PAM2 values.

In the example shown, the PAM4 modulation scheme uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11).

The communication channel 506 is a destructive medium in that the channel acts as a low pass filter that attenuates higher frequencies more than it attenuates lower frequencies, introduces inter-symbol interference (ISI) and noise from cross talk, power supplies, Electromagnetic Interference (EMI), or other sources. The communication channel 506 can be over serial links (e.g., a cable, PCB traces, copper cables, optical fibers, or the like), read channels for data storage (e.g., hard disk, flash solid-state drives (SSDs), high-speed serial links, deep space satellite communication channels, applications, or the like. The receiver (RX) 534 receives an incoming signal 530 over the channel 506. The receiver 534 can output a received signal 532, "v(n)," including the set of data symbols (e.g., symbols −3, −1, 1, 3, wherein the symbols represent coded binary data).

In at least one embodiment, the transmitter 502 can be part of a SerDes IC. The SerDes IC can be a transceiver that converts parallel data to serial data and vice versa. The SerDes IC can facilitate transmission between two devices over serial streams, reducing the number of data paths, wires/traces, terminals, etc. The receiver 534 can be part of a SerDes IC. The SerDes IC can include a clock-recovery circuit. The clock-recovery circuit can be coupled to an ADC and an equalization block.

Figure 6:
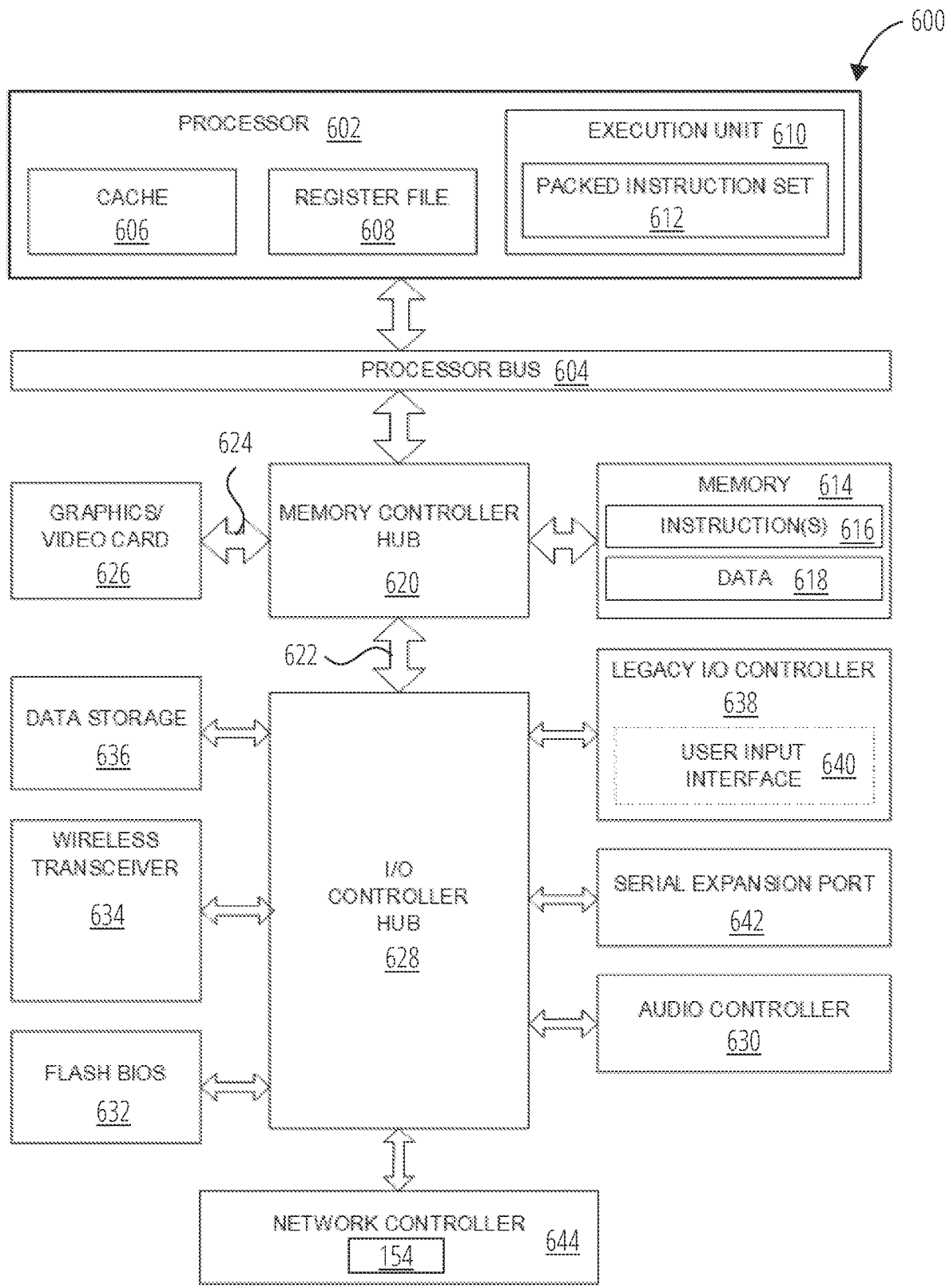
FIG. 6 illustrates an example computer system, including a network controller with a multipath context, in accordance with at least some embodiments.

FIG. 6 illustrates an example computer system 600, including a network controller 644 with a multipath context 154, in accordance with at least some embodiments. The multipath context 154 is used to send packets of a single transport flow over multiple network paths to the same destination, as described herein. In at least one embodiment, computer system 600 may be a system with interconnected devices and components, a System on Chip (SoC), or some combination. In at least one embodiment, computer system 600 is formed with a processor 602 that may include execution units to execute an instruction. In at least one embodiment, computer system 600 may include, without limitation, a component, such as a processor 602, to employ execution units including logic to perform algorithms for processing data. In at least one embodiment, computer system 600 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 600 may execute a version of WINDOWS' operating system available from Microsoft Corporation of Redmond, Wash., although other operating systems (UNIX and Linux, for example), embedded software, and/or graphical user interfaces, may also be used.

In at least one embodiment, computer system 600 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 807 that may be configured to execute a Compute Unified Device Architecture ("CUDA") (CUDA® is developed by NVIDIA Corporation of Santa Clara, California) program. In at least one embodiment, a CUDA program is at least a portion of a software application written in a CUDA programming language. In at least one embodiment, computer system 600 is a single processor desktop or server system. In at least one embodiment, computer system 600 may be a multiprocessor system. In at least one embodiment, processor 602 may include, without limitation, a complex instruction set computer (CISC) microprocessor, a reduced instruction set computer (RISC) microprocessor, a Very Long Instruction Word (VLIW) microprocessor, and a processor implementing a combination of instruction sets, or any other processor device, such as a digital signal processor, for example. In at least one embodiment, processor 602 may be coupled to a processor bus 604 that may transmit data signals between processor 602 and other components in computer system 600.

In at least one embodiment, processor 602 may include, without limitation, a Level 1 ("L1") internal cache memory ("cache") 606. In at least one embodiment, processor 602 may have a single internal cache or multiple levels of internal cache. In at least one embodiment, cache memory may reside external to processor 602. In at least one embodiment, processor 602 may also include a combination of both internal and external caches. In at least one embodiment, a register file 608 may store different types of data in various registers, including integer registers, floating point registers, status registers, instruction pointer registers, or the like.

In at least one embodiment, execution unit 610, including, without limitation, logic to perform integer and floating point operations, also resides in processor 602. Processor 602 may also include a microcode ("ucode") read-only memory ("ROM") that stores microcode for certain macro instructions. In at least one embodiment, execution unit 610 may include logic to handle a packed instruction set 612. In at least one embodiment, by including packed instruction set 612 in an instruction set of a general-purpose processor 602, along with associated circuitry to execute instructions, operations used by many multimedia applications may be performed using packed data in a general-purpose processor 602. In at least one embodiment, many multimedia applications may be accelerated and executed more efficiently by using the full width of a processor's data bus for performing operations on packed data, which may eliminate the need to transfer smaller units of data across a processor's data bus to perform one or more operations one data element at a time.

In at least one embodiment, execution unit 610 may also be used in microcontrollers, embedded processors, graphics devices, DSPs, and other types of logic circuits. In at least one embodiment, computer system 600 may include, without limitation, a memory 614. In at least one embodiment, memory 614 may be implemented as a Dynamic Random Access Memory (DRAM) device, a Static Random Access Memory (SRAM) device, a flash memory device, or other memory devices. Memory 614 may store instruction(s) 616 and/or data 618 represented by data signals that may be executed by processor 602.

In at least one embodiment, a system logic chip may be coupled to a processor bus 604 and memory 614. In at least one embodiment, the system logic chip may include, without limitation, a memory controller hub ("MCH") 620, and processor 602 may communicate with MCH 620 via processor bus 604. In at least one embodiment, MCH 620 may provide a high bandwidth memory path to memory 614 for instruction and data storage and for storage of graphics commands, data, and textures. In at least one embodiment, MCH 620 may direct data signals between processor 602, memory 614, and other components in computer system 600 and may bridge data signals between processor bus 604, memory 614, and a system I/O 622. In at least one embodiment, a system logic chip may provide a graphics port for coupling to a graphics controller. In at least one embodiment, MCH 620 may be coupled to memory 614 through high bandwidth memory path, and graphics/video card 626 may be coupled to MCH 620 through an Accelerated Graphics Port ("AGP") interconnect 624.

In at least one embodiment, computer system 600 may use system I/O 622 that is a proprietary hub interface bus to couple MCH 620 to I/O controller hub ("ICH") 628. In at least one embodiment, ICH 628 may provide direct connections to some I/O devices via a local I/O bus. In at least one embodiment, a local I/O bus may include, without limitation, a high-speed I/O bus for connecting peripherals to memory 614, a chipset, and processor 602. Examples may include, without limitation, an audio controller 630, a firmware hub ("flash BIOS") 632, a wireless transceiver 634, a data storage 636, a legacy I/O controller 638 containing a user input interface 640, a keyboard interface, a serial expansion port 642, such as a USB port, and a network controller 644, including the multipath context 154 as described herein. Data storage 636 may comprise a hard disk drive, a floppy disk drive, a CD-ROM device, a flash memory device, or other mass storage device.

In at least one embodiment, FIG. 6 illustrates a computer system 60000, which includes interconnected hardware devices or "chips." In at least one embodiment, FIG. 6 may illustrate an example SoC. In at least one embodiment, devices illustrated in FIG. 6 may be interconnected with proprietary interconnects, standardized interconnects (e.g., Peripheral Component Interconnect Express (PCIe), or some combination thereof. In at least one embodiment, one or more components of computer system 600 are interconnected using compute express link ("CXL") interconnects.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or in parallel. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   receiving, by a network interface controller of a first node, a first packet and a second packet of a single transport flow directed to a second node, the single transport flow using a network protocol that allows remote direct memory access (RDMA);
   assigning, by the network interface controller, a first network routing identifier to the first packet and a second network routing identifier to the second packet, the first network routing identifier corresponding to a first network path between the first node and the second node, the second network routing identifier corresponding to a second network path between the first node and the second node, and the second network path being different than the first network path;
   associating, by the network interface controller, a multipath context to a first transport session group, the multipath context storing a first state associated with the first network routing identifier and a second state associated with the second network routing identifier,
   assigning a first queue pair (QP) and a second QP to the multipath context;
   receiving, by a scheduler of the network interface controller from the first QP, a first burst of data in a first session of the first transport session group, wherein the first packet is part of the first burst of data;
   scheduling, by the scheduler using the multipath context, the first burst of data to be sent on the first network path;
   sending, by the first node, the first burst of data to the second node via the first network path;

receiving, by the scheduler from the first QP or the second QP, a second burst of data in a second session of the first transport session group, wherein the second packet is part of the second burst of data;

scheduling, by the scheduler using the multipath context, the second burst of data to be sent on the second network path; and sending, by the first node, the second burst of data to the second node via the second network path.

2. The method of claim 1, wherein the first packet is part of a first burst of packets assigned the first network routing identifier, and wherein the second packet is part of a second burst of packets assigned to the second network routing identifier.

3. The method of claim 1, wherein the network protocol is RDMA over Converged Ethernet (RoCE).

4. The method of claim 1, wherein the network protocol is InfiniBand.

5. The method of claim 1, further comprising:
determining a congestion metric for each of a plurality of network paths between the first node and the second node; and
identifying the first network path and the second network path from the plurality of network paths using the congestion metrics.

6. The method of claim 1, wherein an aggregate bandwidth of the first network path and the second network path collectively is greater than an individual bandwidth of the first network path.

7. The method of claim 1, further comprising:
determining that a subsequent burst of data is to be sent on a different network path than the first network path based on one or more parameters, wherein the multipath context stores a first weight value associated with the first network routing identifier and a second weight value associated with the second network routing identifier; and
selecting, based on at least the second weight value, the second network routing identifier for the second burst of data, responsive to determining that the subsequent burst of data is to be sent on the different network path.

8. The method of claim 7, further comprising:
measuring a round-trip time (RTT) of the first network path; and
updating the first weight value based on the RTT.

9. The method of claim 1, further comprising:
assigning a third QP and a fourth QP to a second multipath context associated with a second transport session group;
receiving, by a second scheduler of the network interface controller from the third QP, a third burst of data in a third session of the second transport session group;
scheduling, by the second scheduler using the second multipath context, the third burst of data to be sent on a third network path between the first node and a third node and the third network path being different than the first network path;
receiving, by the second scheduler from the fourth QP, a fourth burst of data in a fourth session of the second transport session group; and
scheduling, by the second scheduler using the second multipath context, the fourth burst of data to be sent on a fourth network path between the first node and the third node and the fourth network path being different than the third network path.

10. A first node comprising:
memory to store a multipath context and a plurality of queue pairs assigned to the multipath context; and
a network interface controller coupled to the memory, the network interface controller to:
receive a first packet and a second packet of a single transport flow directed to a second node, the single transport flow using a network protocol that allows remote direct memory access (RDMA);
assign a first network routing identifier to the first packet and a second network routing identifier to the second packet, the first network routing identifier corresponding to a first network path between the first node and the second node, the second network routing identifier corresponding to a second network path between the first node and the second node, and the second network path being different than the first network path;
associate the multipath context to a first transport session group, the multipath context storing a first state associated with the first network routing identifier and a second state associated with the second network routing identifier,
assign a first queue pair (QP) and a second QP of the plurality of queue pairs to the multipath context
schedule a first burst of data in a first session of the first transport session group, wherein the first packet is part of the first burst of data a of the single transport flow directed to the second node to be sent via the first network path, the single transport flow using a network protocol that allows remote direct memory access (RDMA); and
schedule a second burst of data in a second session of the first transport session group, wherein the second packet is part of the second burst of data a of the single transport flow directed to the second node to be sent via the second network path.

11. The first node of claim 10, wherein the first packet is part of a first burst of packets assigned the first network routing identifier, and wherein the second packet is part of a second burst of packets assigned to the second network routing identifier.

12. The first node of claim 10, wherein the network protocol is RDMA over Converged Ethernet (RoCE).

13. The first node of claim 10, wherein the network protocol is InfiniBand.

14. The first node of claim 10, wherein the network interface controller is further to:
determine that a subsequent burst of data is to be sent on a different network path than the first network path based on one or more parameters, wherein the multipath context stores a first weight value associated with the first network routing identifier and a second weight value associated with the second network routing identifier; and
select, based on at least the second weight value, the second network routing identifier for a second burst of data in a second session, responsive to determining that the subsequent burst of data is to be sent on the different network path, wherein the first packet is part of a first burst of data in a first session.

15. A communication system comprising:
a first node device;
a second node device;
a first network path comprising a first set of one or more intervening node devices between the first node device and the second node device; and a second network path comprising a second set of one or more intervening node devices between the first node device and the second node device, wherein the first node device is to:
assign a first network routing identifier to a first packet and a second network routing identifier to a second packet, the first network routing identifier corresponding to a first network path between the first node device and the second node device, the second network routing identifier corresponding to a second network path between the first node device and the second node device, and the second network path being different than the first network path, wherein the first packet and the second packet are part of a single transport flow directed to the second node device, the single transport flow using a network protocol that allows remote direct memory access (RDMA);
associate a multipath context to a first transport session group, the multipath context storing a first state associated with the first network routing identifier and a second state associated with the second network routing identifier,
assign a first queue pair (QP) and a second QP to the multipath context
schedule a first burst of data in a first session of the first transport session group, wherein the first packet is part of the first burst of data of the single transport flow directed to the second node device to be sent via the first network path;
schedule a second burst of data in a second session of the first transport session group, wherein the second packet is part of the second burst of data of the single transport flow directed to the second node device to be sent via the second network path;
send the first burst of data to the second node device via the first network path; and
send the second burst of data to the second node device via the second network path.

16. The communication system of claim 15, wherein the first packet is part of a first burst of packets assigned the first network routing identifier, and wherein the second packet is part of a second burst of packets assigned to the second network routing identifier.

17. The communication system of claim 15, wherein the network protocol is RDMA over Converged Ethernet (RoCE).

18. The communication system of claim 15, wherein the network protocol is InfiniBand.

* * * * *